Figure 1:
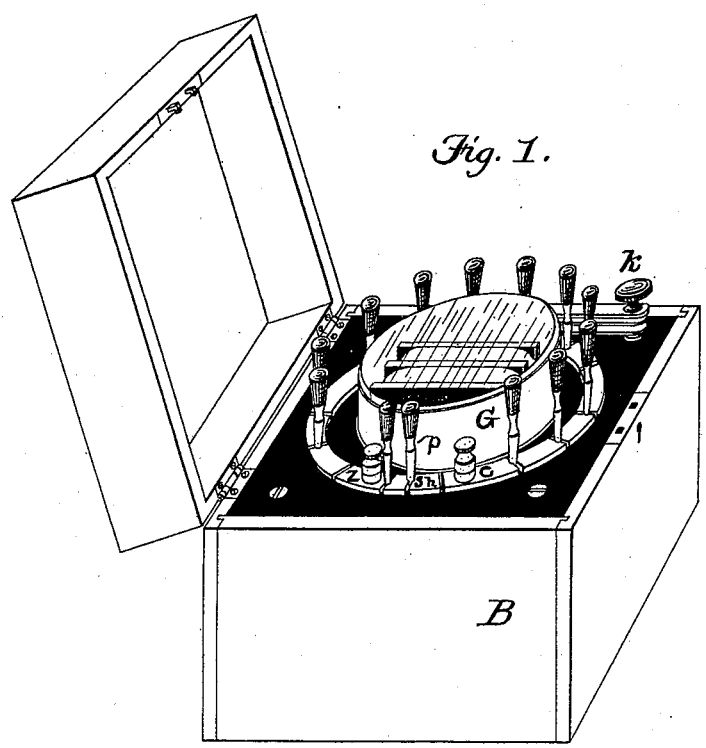

(No Model.) 2 Sheets—Sheet 1.

H. V. HAYES & A. C. WHITE.
ELECTRICAL MEASURING APPARATUS.

No. 395,974. Patented Jan. 8, 1889.

Witnesses.
Geo. Willis Pierce
Philip Hanna

Inventors.
Hammond V. Hayes and
Anthony C. White
by A. Pollok
their attorney.

(No Model.) 2 Sheets—Sheet 2.
H. V. HAYES & A. C. WHITE.
ELECTRICAL MEASURING APPARATUS.
No. 395,974. Patented Jan. 8, 1889.
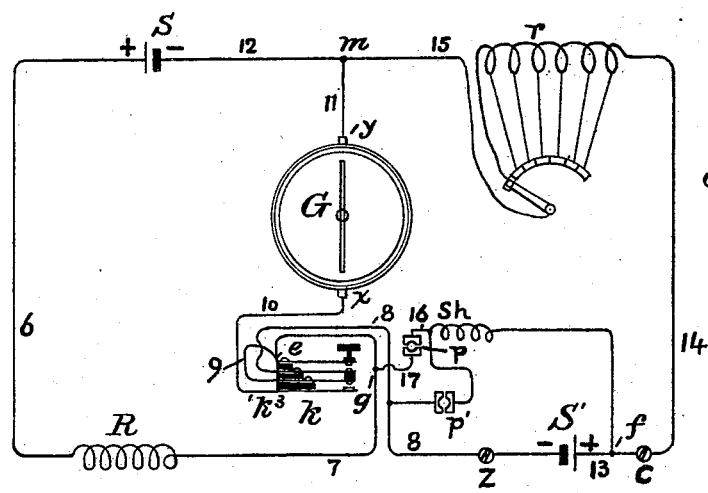
Fig. 3.
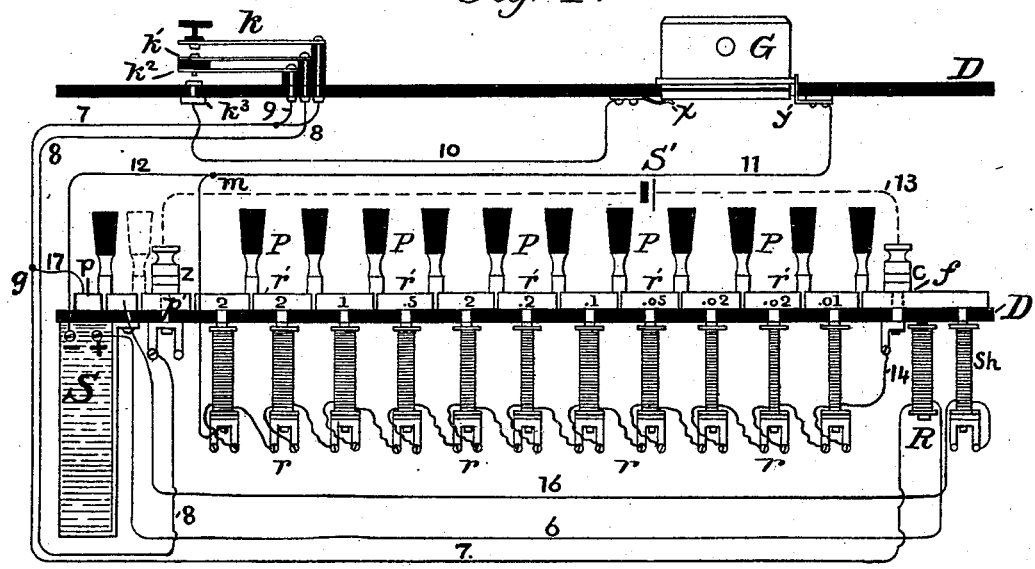
Fig. 4.
Fig. 5.
Witnesses,
Geo. Willis Pierce,
Philip Mauro
Inventors:
Hammond V. Hayes &
Anthony C. White by
A. Pollok
their attorney.

UNITED STATES PATENT OFFICE.

HAMMOND V. HAYES, OF CAMBRIDGE, AND ANTHONY C. WHITE, OF BOSTON, MASSACHUSETTS.

ELECTRICAL MEASURING APPARATUS.

SPECIFICATION forming part of Letters Patent No. 395,974, dated January 8, 1889.

Application filed October 27, 1888. Serial No. 289,351. (No model.)

*To all whom it may concern:*

Be it known that we, HAMMOND V. HAYES, residing at Cambridge, in the county of Middlesex and State of Massachusetts, and ANTHONY C. WHITE, residing at Boston, county of Suffolk, and said State, have invented certain Improvements in Electrical Measurement Apparatus, of which the following is a specification.

This invention relates to apparatus for making electrical measurements, and is applicable particularly to the measurement of electro-motive forces and to the internal resistances of batteries. It is designed for use by persons having no special electrical knowledge, and by its employment direct readings may be taken of the electro-motive force in volts of a battery or other electrical generator, or of the difference of potential between any two points of an electrical circuit, while by a simple additional operation and formula the internal resistance of the battery or of the said other generator, or the resistance of such a portion of the electrical circuit as is included between the two points whose difference of potential is being measured, can also be ascertained. In most instruments heretofore proposed for these purposes a permanent magnet is employed, and as these are liable to constant change it is necessary to frequently recalibrate the instruments. Consequently the readings are either not direct, or, if direct, are often inaccurate, and the amount of electro-motive force can only be arrived at by calculation.

In view of the recognized uncertainty and general inconvenience of such devices, the instrument constituting our invention has been devised. Its object is to furnish an instrument wherein permanent magnets are dispensed with, and which will not require frequent calibration, whereby electro-motive forces may be measured and direct readings indicated in volts without the necessity of calculation, and whereby the operation of ascertaining the internal resistances of batteries and like tests may be materially simplified and made easy.

Our invention is based upon the so-called "Lumsden's" or "Lacoine's" well-known method of determining the comparative electro-motive forces of batteries, which is in principle indicated by one of the figures of the drawings accompanying this specification.

The said method, broadly stated, consists in connecting up a single galvanometer with two separate circuits, each of which contains also a source of electricity and a resistance in such a manner that the currents developed by the two sources will flow through the galvanometer in opposite directions, and will consequently oppose one another with respect to their action thereon. It is clear that the currents of the two circuits, if equal, will exercise an equal effect upon the galvanometer, and that the result will be zero or an absence of deflection, and that, if unequal, a deflection will be produced which will represent the value of the difference between the two strengths; or, in other words, instead of regarding this organization as being composed of two independent circuits, it may alternatively be considered as a single circuit, in which the several instrumentalities are serially connected, the galvanometer being included in a bridge or derivation from one side of the circuit to the other; and inasmuch as all electricians are familiar with the arrangement of a Wheatstone bridge, this is in some respects the more preferable view. One or both of the resistances may now be varied until there is no deflection of the galvanometer-needle. When this occurs, the potential at both terminals of the galvanometer is of course the same. Practically there is no current through the galvanometer, and we then get the proportion S : S′ = R : r, or S is to S′ as R is to r, S and R representing, respectively, the electro-motive force and resistance of one of the circuits and S′ and r the electro-motive force and resistance of the other.

The invention consists in combining a standard battery and a fixed resistance with a galvanometer, an adjustable resistance, and means for connecting the battery or appliance to be measured, and in graduating the adjustable resistance in such a manner that the value of the electro-motive force of said battery in volts may in operation be read off from the figures annexed to such portion of the adjustable resistance as it may be necessary to introduce in order to bring the galvanometer to zero.

It further consists in combining in a single portable and compact organization a standard battery, a fixed resistance in circuit therewith, an adjustable resistance, and means for the attachment of the battery or other generator to be tested. A galvanometer in a portion of the circuit common to both batteries is arranged so that the currents from the two batteries pass when the galvanometer branch is closed through its helices in opposition to one another, and a compound key which normally maintains the circuits of both batteries, as also the galvanometer branch, open or non-continuous, but is adapted to successively close first the battery-circuit and then the galvanometer branch or bridge-wire.

It also comprises the combination, with the instrumentalities hereinbefore recited, of a normally-open shunt-circuit round the battery, generator, or other appliance to be tested, (or bridging the space between the terminals to which such battery may be connected,) which shunt is provided with a manual circuit-closer and circuit-changer, whereby it may be completed through the break-key or completed direct without passing through the said key, as may be desired, the addition of said shunt being adapted to render the instrument capable of being utilized in the measurement of the internal resistance of batteries.

Figure 2:
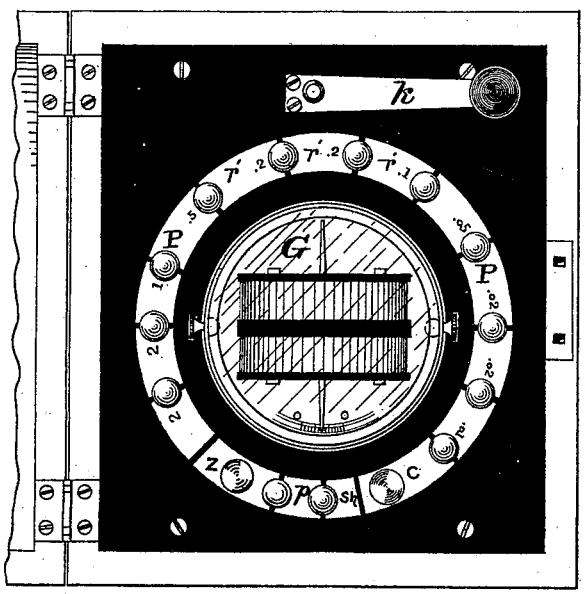

In the accompanying drawings, Figure 1 is a perspective view of an instrument made in accordance with our invention and embodying the same. Fig. 2 is a plan view of the surface, showing the external arrangement of the working parts. Fig. 3 is a theoretical diagram of the electrical circuits, showing a battery under test. Fig. 4 exhibits the actual arrangement of a measuring-set based upon the above theoretical arrangement, and Fig. 5 is a diagram of a modified key system and shunt-circuit arrangement.

Letters or figures of reference are scarcely required in describing Figs. 1 and 2, since in these figures the major part of the requisite arrangement is concealed.

It is sufficient, we believe, to state in explanation that we have mounted our apparatus, as shown, in a convenient box, B, and that the working parts are attached to both sides of a non-conducting base board or partition screwed to the box and represented in Figs. 1 and 2 by a dead-black surface and in Fig. 4 by the letter D. On the upper surface, as shown, appear the galvanometer G, surrounded by the graduated short-circuiting plates $r'$ of an inclosed adjustable resistance, $r$, and their connecting-plugs P, and a compound circuit closing and opening key, $k$. At one side of the graduated plates may be seen two binding-screws or terminals intended for the attachment of the battery or other appliances which are to be tested, these being distinguished by the letters Z and C, indicating the required order of attachment of the respective poles of such battery. Between these are two additional plates (marked $Sh$) and a connecting-plug. These are included in a shunt-circuit, which, as hereinafter to be explained, is in certain operations of the apparatus to be closed either through the key or directly by the insertion of the said plug, while in other operations the shunt is not to be employed and the plug (or plugs) $p$ thereof is consequently withdrawn.

Within the box B and upon the under side of the non-conducting partition D are collected a standard battery, a fixed resistance therefor, the adjustable resistance connected with and controlled by the plates $r'$, and plugs P on the upper surface of the partition, a resistance in the shunt-circuit, and the necessary circuit-connections.

In Fig. 4 the several instrumentalities are shown in a form approximating as closely as possible to that of the measurement set as it has been made, and as indicated in Figs. 1 and 2, although to correctly and clearly delineate all of the circuit-connections we have found it convenient to duplicate in this figure the base board or partition D, the galvanometer G and key $k$ being shown as mounted upon the upper representation, while the remaining appliances are shown as mounted upon the lower. It must then be understood that this part of the arrangement is diagrammatical, and does not indicate the actual relative position of the separate parts.

The galvanometer G, as shown in Figs. 1 and 2, rests in a circular recess in the central portion of the base-board, and is electrically connected in circuit by means of two terminal rings, which press against contact-springs $x$ $y$ in a manner well understood in the art.

In the diagrams, Figs. 4 and 5, G represents the galvanometer; S, a standard battery; R, a fixed resistance; $r$, a variable resistance; $k$, a key controlling the circuits of both batteries, to which, however, the galvanometer is common, and also controlling the circuit of the galvanometer-bridge independently; and S′, the battery to be tested.

It will be found (disregarding for the present the shunt-circuit feature) that the connections of the actual construction, as indicated in Fig. 4, copy closely the theoretical arrangement of Fig. 3. This is simply to make it the more easily understandable, and many modified arrangements of connection are possible, it being only required that the connections shall be so made that the electro-motive forces shall affect the galvanometer oppositely; that the resistance of one of the circuits shall be adjustable, so that the effect of the two electro-motive forces upon the galvanometer may be balanced, and that the circuits of both electro-motive forces and of the galvanometer independently shall pass through the break-key, the object of the latter condition being of course the conservation of the strength and constancy of the standard battery, as also that of the battery under test, and the provision that the battery-circuit shall always be closed before that of the galvanometer, which otherwise might suffer injury by the sudden rush of a comparatively strong current therethrough.

Having, then, premised that the electrical connections are alike in both diagrams, it will be a simpler matter to trace Fig. 3. From the plus or positive pole of the standard battery S wire 6 leads to the fixed resistance R, and thence by wire 7 to the uppermost conducting-strip of the key. At this point the circuit of the standard battery is open when the apparatus is not in use. When the key is fully closed, the circuit continues by way of wire 9 and the third strip, $k^2$, of the key, which makes contact with the fourth strip or anvil, $k^3$; thence by wire 10 to one terminal, $x$, of the galvanometer, through the helix thereof to the other terminal, $y$; thence by wire 11 to the junction-point $m$ of the bridge-wire with the main circuit, and by wire 12 to the minus or negative pole of the standard battery. Thus the circuit of the said battery, considering the galvanometer-bridge as a part thereof, includes the fixed resistance and the galvanometer, and the current thereof enters the galvanometer at a definite terminal, $x$.

The circuit of the battery to be tested, S', (still disregarding the shunt-circuit,) from its positive pole may be traced as follows: Battery S', wire 13, binding-screw C, wire 14, adjustable resistance $r$, wires 15, junction-point $m$, and galvanometer G, wire 10, and by way of both contacts of the key, when closed, and wire 8 to binding-screw Z, and thence to the negative pole of the battery. The circuit of this battery is thus seen to include the adjustable resistance and the galvanometer, and its current enters the galvanometer at the terminal $y$ thereof, and hence directly opposes that of the standard battery.

Regarding the arrangement as a bridge system, it will be observed that in the main circuit the instrumentalities are arranged as follows: standard battery S, fixed resistance R, the upper contacts of the key, the battery to be tested, S', adjustable resistance $r$, and thus back to the other pole of the standard battery. The two batteries in this circuit are so connected that they re-enforce each other.

The galvanometer G is in a cross-wire from the point $m$ to the point $e$, dividing the circuit into two parts, one including the standard battery and the fixed resistance and one break of the key, while the other includes the battery under test, the adjustable resistance, and both breaks of the key. The two batteries thus oppose each other in the galvanometer.

The galvanometer G is a simple indicating-galvanometer having coils of high resistance, and is common to both circuits, which join one another at the points $m$ and $e$.

The fixed resistance R is made, preferably, of German silver or any like metal or alloy which varies little in resistance with variations of temperature and has a resistance of about one thousand ohms. The several coils of the variable resistance $r$ (see Fig. 4) range from ten to two thousand ohms. The standard battery S may be any constant cell of convenient size.

With the above explanation it is believed that the principle of the arrangement can be readily understood by reference to the drawings.

The variable resistance $r$ is varied until the potential at the galvanometer terminal $x$ is the same as that at the other terminal, $y$, or, in other words, until the two opposing currents through the galvanometer are alike in strength, from which we have the relation, as already stated, $S : S' :: R : r$. Hence $S' = \frac{S \cdot r}{R}$. By giving R such a value that $\frac{S}{R}$ equals 1 or .1 or .01, then S' equals $r$ multiplied by 1, .1, or .01, &c. To measure the electro-motive force of any battery, the zinc and copper or analogous poles of the cell to be tested are connected with the two corresponding screw-terminals, Z and C, of the instrument, and the key is repeatedly depressed, the plugs P of the variable resistance $r$ being successively withdrawn until there is no deflection of the galvanometer-pointer upon the depression of the key $k$. When this occurs, as already stated, the current through the galvanometer from the cell under test is equal and opposite to that of the standard cell.

The instrument is calibrated by the manufacturer, in accordance with the principles hereinbefore enunciated, in such a manner that the sum of the figures annexed to the plugs which have been withdrawn will indicate the electro-motive force in volts and fractions of volts of the cell under test. The shunt-circuit, which has up to this point been disregarded, is looped round the cell to be tested, as shown in Figs. 3 and 4. Leaving the point $f$, it passes through a resistance-coil, $Sh$, of about ten ohms resistance, (experience having indicated this resistance to be a convenient one,) and then may be traced by wire 16, and through a plug-circuit breaker and changer, $p$, and wire 17 to the point $g$ on wire 7, which leads to the uppermost strip of the key $k$. The remainder of the shunt-circuit, when formed through the circuit-breaker $p$, is by way of the second key-strip, $k'$, and wire 8 to the other side of the battery S', a portion of the main circuit being thus utilized. By this expedient the shunt, as well as the main circuit, is led through the break-key, and the shunt-circuit, as well as the main, is kept open until the actual depression of the key. In Fig. 4 the plug $p$ is in place, and is shown as completing the shunt-circuit through the key. We prefer, however, in view of the fact that it is often desirable to establish a closed shunt round a battery to be tested, to arrange an alternative connection, which is shown in Figs. 3 and 4. This extends in practice from the first plate of the circuit-closer $p$ to a second circuit-closer, $p'$, connecting directly with the main circuit at or near the binding-screw Z, so that by withdrawing the plug from $p$ and transferring it to $p'$ the shunt-circuit is closed round the battery S' continuously and independently of the break-key $k$, which continues to control the two main circuits.

During the measurement of electro-motive force the shunt-plug $p$ is withdrawn altogether. To measure the internal resistance of a battery, the plug is introduced at $p$ or $p'$, according to the conditions under which it may be desired to measure the cell, and an additional reading is made.

The entire operation will now be as follows: The electro-motive force of the cell is first taken with the shunt-plug out, as hereinbefore explained, and may be called "E." The shunt-plug is then inserted, which short-circuits the battery through ten ohms. The electro-motive force of the battery now on short circuit is again taken, and may be called "E'." The internal resistance which is to be found may be called "B," the current developed through the shunt-circuit by the battery under test "C," and the ten-ohms resistance "N."

$$\text{Then } C = \frac{E'}{N} \text{ and } C = \frac{E}{N+B}$$

$$\text{Therefore } \frac{E'}{N} = \frac{E}{N+B}, \text{ and } E'N + E'B = EN.$$

$$\text{Hence } B = \frac{E - E'}{E'} \times N.$$

But N equals ten ohms. Hence the battery-resistance can be found by subtracting the electro-motive force of the battery when closed through the shunt-circuit from that observed when the shunt-circuit is open, dividing by the former and moving the decimal point one place to the right.

The modification shown in Fig. 5 simply consists in passing the shunt-circuit through a single plug circuit-closer, $p$, and in causing it also to pass through a third contact in a special key having an additional contact provided for this purpose.

The instrument by reason of its portability, simplicity, and convenience is especially adapted for use in telephone work, and the feature last described—namely, its capability for measuring with sufficient accuracy the internal resistance of batteries adds greatly to its practical value in this respect. Although this description has chiefly referred to the electro-motive forces and resistances of batteries, the instrument is of course equally applicable to the measurement of higher electro-motive forces—such as, for instance, those developed by dynamo-electrical machines and between any two points of a circuit. It is rendered perfectly available for this purpose by the addition of a few more coils to the adjustable resistance, whereby the range of the instrument would be correspondingly increased. We desire, also, to point out that our invention can be utilized in the measurement of other resistances in addition to that of the battery, which is itself under test, and that therefore it is useful where it is the only instrument at hand.

It is clear from what has been said that the resistance measured in the internal-resistance test is, speaking with accuracy, the resistance of all of that portion of the circuit that lies between the two terminals of the shunt. With this understanding it is further evident that should it be required to ascertain the resistance of any other appliance—such as a coil of insulated wire or an electro-magnet—it is within certain limits only necessary to include the said coil or electro-magnet in that part of the circuit which is so bounded, together with the battery under test, and that when the resistance of the battery is already or first ascertained all that remains to be done is to deduct this from the result of the final calculation, which is made in precisely the same manner as that of the original internal-resistance test.

Having now fully described our invention, we claim—

1. The combination, in a direct-reading voltmeter, of a standard battery, a fixed resistance, terminals for connecting a battery or other generator to be tested, an adjustable and calibrated resistance, all in circuit together, a galvanometer in a bridge or derived circuit, a circuit-closer for simultaneously closing the circuit of the standard battery through the fixed resistance and the circuit of the generator under test through the adjustable resistance, and for directing the currents of both immediately thereafter, but in opposite directions, through the galvanometer, and means for varying the adjustable resistance until the currents through the galvanometer, as indicated by the absence of deflection, are equal, the said adjustable resistance being so calibrated that the figures representing the amount of adjustable resistance in circuit shall indicate in direct terms the electro-motive force required.

2. In an electrical measurement apparatus, the combination of the testing-circuit, the galvanometer in a bridge dividing said circuit into two parts, a standard battery and fixed resistance on one side of said bridge, an adjustable resistance and terminals for introducing a generator to be tested on the other side of said bridge, so that the current of said generator will oppose that of the standard battery in the galvanometer, and a compound circuit-controlling key normally maintaining both divisions of the circuit as well as the bridge open, but adapted when depressed to close both divisions and also said bridge, substantially as described.

3. The combination, substantially as hereinbefore described, in a direct-reading voltmeter, of a normally-open testing-circuit, a galvanometer in a bridge or derivation of the said circuit, the said bridge acting to divide the said circuit in two parts, itself being common to both, a standard battery and a fixed resistance included in the said circuit on one side of the bridge, terminals for the connection in said circuit of a battery or other generator to be tested, the said terminals being located upon the remaining side of the bridge and adapted to connect with the said generator so that its current shall pass through the galvanometer in a direction opposite to that of the standard battery, a key normally maintaining both divisions of the circuit and also the bridge-circuit open, and adapted when depressed to close both, and also the said bridge, and an adjustable resistance connected in that part of the circuit which includes the generator under test, and having its several coils so proportioned, calibrated, and graduated that the figures opposite the coils introduced shall when the galvanometer-needle remains without deflection upon the depression of the key indicate the electro-motive force in volts of the generator under test.

4. In a direct-reading voltmeter for measuring the electro-motive force of a battery or other electrical generator, the combination of a testing-circuit, including a variable resistance through a galvanometer, and a standard battery in a circuit through said galvanometer, including a fixed resistance, the current of said standard battery in the galvanometer being in opposition to that of the generator under test, the said variable resistance being so calibrated and graduated that the amount required to effect a balance indicates in direct terms the electro-motive force of the battery under test by means of figures placed opposite the resistance-varying plugs, substantially as described.

5. In an electrical measurement apparatus, the combination of a test-circuit, a galvanometer in a bridge dividing said circuit into two divisions, a standard battery and fixed resistance in one division, and in the other a variable resistance and terminals for connection of a generator to be tested in such manner that its current will pass through the galvanometer in the opposite direction to that of the standard battery, means for closing the circuit of both generators and of the galvanometer when a test is to be made, a normally-open shunt-circuit around the terminals for the generator to be tested, a fixed resistance in said shunt, and a circuit-closer therefor, substantially as and for the purpose described.

6. The combination, substantially as hereinbefore described, in an electrical measurement apparatus, of a direct-reading voltmeter comprising a testing-circuit, including a variable resistance and galvanometer, and a standard battery in circuit through said galvanometer with a fixed resistance, the battery or generator to be tested being in operation connected in the test-circuit, so that its current will oppose that of the standard battery in said galvanometer, the said variable resistance being calibrated and graduated in such manner that the amount required to effect a balance indicates in direct terms the electromotive force of the generator under test, with a normally-open shunt-circuit connected around the said battery under test or looping from the fixed terminals thereof, and a circuit-closer therefor, whereby a second reading may be taken with the said shunt closed and the resistance of said battery deduced from the relations of the two readings, as set forth.

7. The combination, in an instrument for measuring electro-motive forces and resistances, of a standard battery, terminals for connecting a battery or other generator to be tested in such a way that its current will reenforce that of the standard battery in direct circuit, a fixed resistance, an adjustable resistance consisting of a number of spools of wire adapted to be introduced and withdrawn from circuit by the withdrawal or introduction of plugs, and calibrated, as described, to indicate electro-motive forces in direct terms, a normally-open electric circuit serially connecting the said instrumentalities, a galvanometer, a bridge or derived circuit, including the said galvanometer, and connecting with the said normally-open circuit so as to divide it in two parts, itself being common to both, one including the standard battery and fixed resistance and the other the terminals of the battery to be tested, and the adjustable resistance, a compound key controlling both parts and adapted to close the circuits of the standard battery and of the battery under test through the galvanometer, and a shunt-circuit shunting the terminals of the battery under test, and controlled also by the said key, whereby the internal resistance of a battery may be calculated from its shunted and unshunted electro-motive forces.

8. In an instrument for electrical measurement, the combination, with a standard cell, a fixed resistance in circuit therewith, and a galvanometer, circuit-connections whereby the cell to be measured may be caused to oppose its current to that of the standard cell in the galvanometer-coils, a circuit-closing key controlling the circuit of both batteries and adapted to direct by the same motion the current of both, but oppositely, through the galvanometer, devices for varying the resistance in the circuit of the cell under test, the said devices being calibrated and graduated so that the amount of resistance introduced will indicate in direct terms the electro-motive force of the cell under test, and a shunt-circuit of known resistance arranged to short-circuit the said cell under test, substantially as and for the purposes specified.

9. In an instrument for measuring electrical magnitudes, the combination, with a standard cell, a fixed resistance in circuit therewith, and a galvanometer, of circuit-connections whereby the battery or like appliance to be tested may be connected and caused to traverse the galvanometer-coils in a direction opposite to that of the standard cell, a circuit-closing key controlling the circuit of both batteries and adapted to close both, and thereupon to direct their currents through the galvanometer, so as to oppose one another therein, devices for varying the resistance in the circuit of the cell under test, the said devices being calibrated and graduated in such a manner that the amount of resistance introduced will indicate in direct terms the electro-motive force of a cell under test, a shunt-circuit of known resistance arranged to short-circuit the said cell under test for the measurement of its internal resistance, and circuit-changing devices interposed in the said shunt-circuit, whereby it may be closed direct or diverted through the circuit-controlling key, substantially as specified.

In testimony whereof we have signed our names to this specification, in the presence of two subscribing witnesses, this 13th day of October, 1888.

HAMMOND V. HAYES.
ANTHONY C. WHITE.

Witnesses:
E. BERLINER,
V. M. BERTHOLD.